Nov. 2, 1954  F. A. FASANO  2,693,295
HANDLED UTENSIL TO BE HEATED AND HANDLE THEREFOR
Original Filed Sept. 6, 1945

INVENTOR
Fred A. Fasano
BY
ATTORNEY

United States Patent Office 2,693,295
Patented Nov. 2, 1954

2,693,295

HANDLED UTENSIL TO BE HEATED AND HANDLE THEREFOR

Fred A. Fasano, Richmond Hill, N. Y.

Continuation of application Serial No. 614,681, September 6, 1945. This application May 24, 1952, Serial No. 289,750

5 Claims. (Cl. 220—94)

This invention relates to utensils to be heated and provided with self cooling handles and the handles therefor.

This application is a continuation of my co-pending application, Ser. No. 614,681, filed Septmber 6, 1945, and now abandoned.

An object of this invention is to provide a utensil of the character described, such as a pot or pan for frying or cooking, provided with a metal handle so constructed that the part of the handle which is held in the hand will not get hot even though the pot or pan itself is subject to a considerable amount of heat.

Another object of this invention is to provide an article of the character described, comprising a metal pot or or other utensil and a metal handle attached thereto and comprising a corrugated or zig zag portion and a hand grip portion, said corrugated portion comprising substantially vertical lateral portions interconnected by alternating top and bottom U-shaped portions, said corrugated portion being disposed between the hand grip portion and the utensil and forming a plurality of openings or slots which open upwardly and a plurality of openings which open downwardly to effectively dissipate heat so as to insulate the hand grip portion.

I have found that with such construction heat applied to the pan will not pass entirely through the whole corrugated portion. Heat passing by conduction from the pot or pan to the part of the corrugated portion attached thereto becomes dissipated since air heated by the metal of the corrugated portion passes upwardly through the upwardly opening slots or openings and such heat is effectively carried away from the corrugated portion.

It will be noted that the handle is made from a strip of metal and no non-metallic heat insulating material need be used, yet the insulating properties of the handle due to this construction is such that the application of even high temperatures to the pot or pan or to the portion of the handle which is attached to the pot or pan, for long periods will not result in heat passing through to the hand grip portion which remains cool and can be held in the hand comfortably.

While this invention is described as being applied to pots or pans or handles therefor, it is understood that the handle, the subject matter of this application, may be applied to any cooking utensil or any other device which is subject to heat and which must be manipulated by means of the handle to be gripped by the hand.

Still another object of this invention is to provide a handle which may be attached to a pot or pan and which is made from a single elongated strip of metal and provided at one end with a tongue adapted to be riveted or otherwise fixed to a pot or pan, said tongue extending downwardly and having a U-shaped bend at its upper end from which extend a plurality of zig zag portions, said zig zag portions comprising substantially parallel lateral portions extending generally in an up and down direction, with interconnecting bends at top and bottom, and an offset hand grip portion extending from the last of the zig zag portions.

Yet a further object of this invention is to provide a strong, rugged, and durable device of the character described, which shall be relatively inexpensive to manufacture, comfortable to use, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which are shown various illustrative embodiments of this invention:

Figure 2:
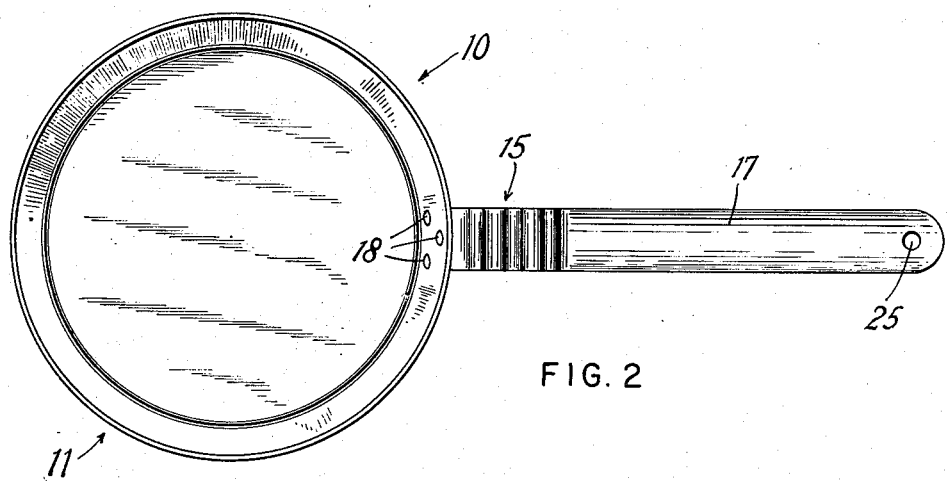
Fig. 2 is a top plan view of said device.

Referring now in detail to the drawing, 10 designates an article embodying the invention. The same comprises a metal pot or pan or utensil 11 to which is attached a handle 12. The pot or pan or utensil 11 comprises, in the form illustrated, a flat circular bottom wall 13 from which extends upwardly and outwardly a tapering portion 14. The pot or pan 11 may be of any depth. While the drawing shows a pot or pan, it will be understood that any cooking utensil or any other article subject to considerable heat, may be substituted for the pot or pan 11, said pot or pan being shown by way of illustration.

The handle 12 is made from a single strip of metal such as steel or iron. The same comprises generally of a zig zag or corrugated portion 15 from one end of which extends a tongue 16 and from the other end of which extends an upwardly inclined hand grip portion 17. The tongue 16 extends downwardly and forwardly and conforms to the inclination of the wall 14 and may be attached thereto by rivets or any other suitable fastening means 18.

Extending from the upper end of the tongue 16 is a top bent over or U-shaped portion 19 from which extends downwardly a lateral portion 20. Extending from the lower end of the downwardly extending lateral portion 20 is an upwardly bent U-shaped portion 21.

Extending upwardly from the bent over portion 21 is an upwardly extending lateral portion 22 substantially parallel to portion 21. Extending from the upper end of the upwardly extending lateral portion 22 is another U-shaped or bent over portion 19 from which extends downwardly another downwardly extending portion 20. Such construction is continued for any number of corrugations or zig zag portions although I have found that 3, 4, or 5 are sufficient to act as an adequate insulator for practical purposes.

Extending from the upper end of the last upwardly extending portion 22 is the upwardly and outwardly inclined hand grip portion 17. This portion 17 may be transversely downwardly curved if desired, and it may be provided, furthermore, with a hole or opening 25 near its outer end so that the utensil may be hung up on a hook.

The strip of metal of which handle 12 is made may be about 1" in width. The heights of the corrugated portion may be between ½" and 1" in height.

I have found that with the construction described herein, the application of a considerable amount of heat to the pot or pan 11 will not result in the hand grip portion 17 becoming hot. It remains cool and can be comfortably held with the hand. Even if the tongue 16 of the handle 12 is subjected to the heat of a blow torch for 20–30 minutes, the hand grip portion 17 will not become hot. Heat passing out of the portions 20, 21 and 22 into the slots or openings 26 pass upwardly by convection thereby dissipating considerable amount of heat. If the lateral portions 20, 22 were in generally horizontal direction, heat passing up from one lateral portion would traverse the space to the next lateral portion and then again enter the metal so that the dissipation of the heat would not be sufficient to obtain good insulating properties.

It will be noted that the bend 19 which extends from the tongue 16 is somewhat above the level of the upper edge 14a of the wall 14 and that the corrugated portion as a whole is somewhat inclined upwardly and outwardly, and that the hand grip portion 17 is also somewhat inclined upwardly.

The corrugated portion further acts as a barrier to prevent flame under the utensil from creeping to the hand grip portion 17, as sometimes happens when a straight handle is used.

It will now be understood that the handle is a self cooling handle and that high degrees of heat travelling outwardly through the loops of the zig zag or corrugated portion is kept from reaching the hand grip portion because the heat is dissipated into the cooler air in the slots which open directly upwardly so that heat is carried away from the metal, whereby the portion of the handle which is grasped remains cool. The heat which is transmitted from the metal into the air in the slots which open upwarly, is effectively carried away from the metal and does not re-enter the metal, and this result is obtained by making the corrugations or loops up and down instead of sideways.

Figure 1:
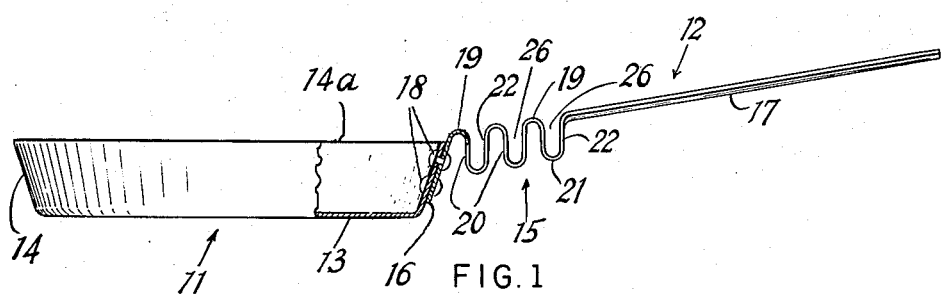
Fig. 1 is a side elevational view of the device embodying my invention with part broken away and in cross section.
Figure 3:
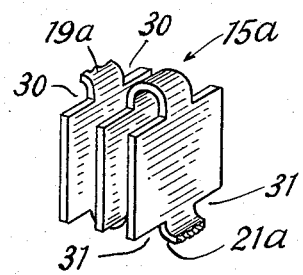
Fig. 3 is a partial perspective view of the corrugated portion and illustrating a modified construction.

In Fig. 3 there is shown a modification similar to the device shown in Figs. 1 and 2 with the exception that in the corrugated portion 15a shown in Fig. 3, top bends 19a have their sides cut away as at 30. Also the lower bends 21a have their side portions 31 cut away thereby reducing the widths of the bend portions 19a, 21a to further insulate the hand grip portion 17.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to protect by Letters Patent:

1. A device of the character described, comprising a receptacle to be heated comprising a bottom wall and an annular upstanding wall, a handle made of a single strip of metal, and comprising a zig zag portion, said zig zag portion comprising a plurality of lateral substantially vertical portions interconnected by alternating top and bottom U-shaped portions, a tongue extending downwardly from the top U-shaped portion at one end of the zig zag portion, means attaching said tongue to the upstanding wall of said receptacle, and a hand grip portion extending from the upper end of the latter portion at the opposite end of said zig zag portion.

2. The combination of claim 1, a major portion of said zig zag portion projecting below the plane of the top of said upstanding wall and a minor portion thereof projecting above said plane.

3. The combination of claim 1, a major portion of said zig zag portion projecting below the plane of the top of said upstanding wall and a minor portion thereof projecting above said plane, said zig zag portion being inclined upwardly and outwardly from said receptacle, and said hand grip portion being inclined upwardly and outwardly.

4. A self cooling handle for a device of high temperature, comprising an elongated strip of heat conducting material, one end of which is adapted to be secured on the device, the other end to be used as the handle proper to be grasped by the hand of the user, repeated continuous up and down turns, formed in said strip of material between said two ends, said turns generally being transverse to its plane and having spaced apart sides, a portion of the material of said strip in the two sides of the bends for said turns being removed, whereby the connection between the two sides of the respective turn, and the heat conduction therethrough, will be reduced.

5. In a self cooling handle for a device of high temperature, one end portion of said handle being adapted to be secured on the device, and the other end portion to be grasped by the user, an elongated strip of heat conducting material between said two ends, repeated continuous up and down turns, formed in said strip of material, said turns generally being transverse to its plane and having spaced apart sides, a portion of the material of said strip in the two sides of the bends for said turns being removed, whereby the connection between the two sides of the respective turn, and the heat conduction therethrough, will be reduced.

References Cited in the file of this patent

UNITED STATES PATENTS

| Number | Name | Date |
|---|---|---|
| 58,279 | Mueller | Sept. 25, 1866 |
| 524,854 | Knapp | Aug. 21, 1894 |
| 804,770 | Rogers | Nov. 14, 1905 |
| 807,836 | Madeira | Dec. 19, 1905 |
| 2,283,019 | Serr | May 12, 1942 |

FOREIGN PATENTS

| Number | Country | Date |
|---|---|---|
| 1,904 | Great Britain | May 13, 1879 |